United States Patent [19]

Blahak et al.

[11] 3,821,282

[45] June 28, 1974

[54] POLYMERISABLE ANTHRANILIC ACID ESTERS

[75] Inventors: Johannes Blahak, Koeln; Erwin Müller; Ludwig Mott, both of Leverkusen; Ernst Schwinum, Leichlingen, all of Germany

[73] Assignee: Bayer Aktiengesellschaft, Leverkusen, Germany

[22] Filed: Apr. 5, 1972

[21] Appl. No.: 241,459

[30] Foreign Application Priority Data

Apr. 7, 1971 Germany............................ 2116973

[52] U.S. Cl... 260/471 R, 260/77.5 AN, 260/80.73, 260/86.1, 260/83.5, 260/86.3, 260/86.7, 260/89.5
[51] Int. Cl............................................ C07c 01/54
[58] Field of Search................................ 260/471 R

[56] References Cited
UNITED STATES PATENTS 3,123,631  3/1964  Staiger et al.................... 260/471 R

*Primary Examiner*—Lorraine A. Weinberger
*Assistant Examiner*—L. A. Thaxton
*Attorney, Agent, or Firm*—Connolly and Hutz

[57] ABSTRACT

Polymerisable anthranilic acid esters are obtained by heating acrylic or methacrylic acid esters containing hydroxyl groups with isatoic anhydride in an organic inert medium at temperatures of from 30° to 150°C in the presence of strong basis. They may be polymerised alone or in combination with other monomers by the methods of bulk solution suspension or emulsion polymerisation. Cross-linkage is possible even with the aid of polyisocyanates, formaldehyde and formaldehyde resins.

1 Claim, No Drawings

POLYMERISABLE ANTHRANILIC ACID ESTERS

This invention relates to (meth) acryloyl hydroxy alkyl anthranilic acid esters in which the alkyl group may be interrupted by oxygen atoms, and to the use of these anthranilic acid ester monomers for the production of homopolymers and copolymers.

The production of unsaturated compounds which are derived from acrylic or methacrylic acid and which, in addition to the double bond, contain an ester group and an amino group is a known process. One representative of this class of compounds is the β-aminoethyl ester of methacrylic acid of the following formula

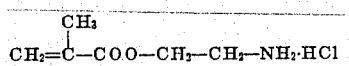

which can be obtained by reacting methacryl chloride with ethanolamine hydrochloride. However, this compound is only adequately stable in the form of the hydrochloride. The free base reacts immediately through Michael addition to form polymers, accompanied by splitting of the ester group attributable to aminolysis.

It is also known from U.S. Pat. No. 3,123,631 that isatoic acid anhydride can be reacted with unsaturated alcohols, such as cinnamyl alcohol, allyl or methallyl alcohol, in the presence of sodium hydroxide at a temperature of from 45° to 100° C to form the corresponding esters. Despite their unsaturated group, compounds such as these have little or no suitability for use as polymerisable monomers.

The object of the invention is to provide novel homopolymerisable and copolymerisable methacrylic and acrylic acid derivatives based on esters of anthranilic acid and crosslinkable homopolymers and copolymers of these monomers.

According to the invention, this object is achieved by virtue of the fact that isatoic acid anhydride is heated in an inert medium with acrylic acid or methacrylic acid hydroxy ester in the presence of a strong base. The resulting monomers can be converted in a smooth reaction into crosslinkable homopolymers and copolymers.

Accordingly, the invention relates to polymerisable monomers corresponding to the formula (I)

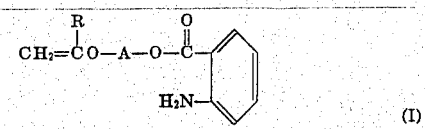

wherein R represents hydrogen or methyl whilst A represents the radicals — $OC_nH_{2n}$ in which $n = 2$ to 10, or

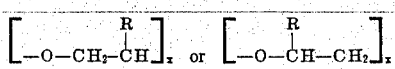

in which $x = 1$ to 10.

A preferably represents the alkylene radical — $OC_nH_{2n}$ in which $r = 2$ to 4 or

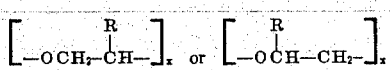

in which $x = 1$ to 4.

The invention also relates to the use of the aforementioned monomers for the production of homopolymers and copolymers which can be crosslinked through the primary aromatic amino group with formaldehyde, formaldehyde donors or polyisocyanates.

The monomers according to the invention are prepared by heating the acrylic acid or methacrylic acid hydroxy ester with isatoic acid anhydride in an organic reaction medium which does not react with the isatoic acid anhydride (preferably ethers or ketones), in the presence of a strong base such as an alkali metal hydroxide, an alkali metal carbonate or a tertiary amine such as triethylamine or dimethylbenzyl amine, but preferably in the presence of sodium hydroxide, to a temperature in the range of from 30° to 150° C and preferably at a temperature of from 60° to 100° C.

The reaction proceeds substantially quantitatively in accordance with the following scheme:

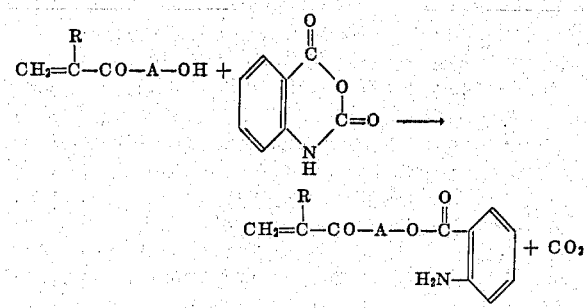

The starting materials are generally reacted in substantially equimolecular quantities. In this connection, it is of advantage in order completely to react the (meth) acrylic acid hydroxy ester to use an excess of up to about 10 mol per cent of isatoic acid anhydride, based on 1 OH—equivalent of the (meth) acrylic acid hydroxy ester. It is of course also possible by using a deficit of isatoic acid anhydride to obtain a lower degree of reaction of the hydroxy ester. Reaction products of this kind are mixtures of monomers obtained in accordance with the invention and unreacted (meth) acrylic acid hydroxy ester and can be used for the copolymerisation reaction.

The basic catalyst is used in a quantity of from 0.1 to 10 parts by weight per 100 parts by weight of hydroxy ester, and preferably in a quantity of from 1 to 10 parts by weight.

It is also of advantage to work in the presence of stabilisers in concentrations of from 0.01 to 1 percent by weight based on the saturated compound, and preferably in a concentration of about 0.1 percent by weight. Preferred stabilisers include methylene blue, 4-methoxymethyl-2,6-di-tert.-butyl phenol, phenthiazine and copper powder.

The end products are directly obtained after filtration abd evaporation of the solvent.

The smooth reaction of the (meth) acrylic acid hydroxy ester and of the isatoic acid anhydride to form the monomers according to the invention is surprising insofar as, in the presence of alkaline catalysts, aniline for example reacts with acrylic acid derivatives, such as acrylonitrile for example, through Michael addition, the authors even having obtained a diadduct with aniline and acrylonitrile (cf. R. C. Cookson and F. G. Mann, J. Chem. Soc. 1949, 67).

By contrast, the process according to the invention is not accompanied by any secondary reactions which, in addition to the Michael addition, would also be posswble through chemical addition of the isatoic acid anhydride with the highly reactive double bond or through ester aminolysis.

The products according to the invention are viscous oils which, with the exception of the methacryloyl hydroxy ethyl anthranilic acid ester, do not show any tendency towards crystallisation and which may be used as intermediate products for a variety of different syntheses, but more particularly as polymerisation and copolymerisation partners.

The following are mentioned as particularly preferred monomers according to the invention: methacryloyl hydroxy ethyl anthranilic acid ester, acryloyl hydroxy ethyl anthranilic acid ester, methacryloyl hydroxy propyl anthranilic acid ester, acryloyl hydroxy propyl anthranilic acid ester, acryloyl hydroxy butyl anthranilic acid ester and methacryloyl hydroxy butyl anthranilic acid ester.

The invention also relates to the use of the monomers according to the invention for the production of homopolymers and copolymers.

To this end, the monomers according to the invention can be polymerised either individually or in admixture with one another or alternatively one or more of these monomers can be polymerised with other copolymerisable ethylenically unsaturated compounds.

In the context of the invention, the term copolymerisation applies not only to processes which lead to copolymers in which the monomers are present in statistical distribution, or to block copolymers, but also to processes in which monomers are grafted on to a preformed homopolymer or copolymer.

Although the monomers according to the invention can be copolymerised with other monomers in any ratios by weight, they are used for copolymerisation in quantities of from 1 to 30 percent by weight and more particularly in quantities of from 4 to 20 percent by weight, based on the monomer total, in order to vary the properties of the copolymers obtained.

Polymerisation can be carried out either continuously or in batches, in homogeneous or heterogeneous phase by the known methods of bulk, emulsion, solution, bead, suspension or precipitation polymerisation as described in detail for example in "Methoden der organischem Chemie" Houben-Weyl, Vol. 14/I, 4th Edition, 1961, pages 131 – 565).

Suitable polymerisation catalysts include inorganic percompounds such as potassium or ammonium persulphate, hydrogen peroxide, percarbonates, organic peroxide compounds such as acryl peroxides, for example benzoyl peroxide, alkyl hydroperoxides such as tert.-butyl hydroperoxide, cumene hydroperoxide, p-menthane hydroperoxide, dialkyl peroxides such as di-tert.-butyl peroxide, peroxy esters such as perbenzoic acid-tert.-butyl ester, and azo compounds such as azo diisobutyronitrile for example. The radical formers may optionally be used in combination with reducing agents such as sodium pyrosulphite, sodium-formaldehyde sulphoxylate, triethanolamine or tetraethylene pentamine.

The catalysts are used in the usual quantities, i.e., in quantities of from 0.01 to 5.0 percent by weight, based on the monomer total.

The polymerisation reaction can be carried out at temperatures of from 0° to 150° C in dependence both upon the method of polymerisation and also upon the type of catalyst system.

Conventional molecular weight regulators such as alkyl mercaptans, diisopropyl xanthogenate, nitro compounds or organic halogen compounds, can be used in the polymerisation reaction.

In cases where polymerisation is carried out in emulsion, it is possible to use both anionic and also cationic or non-ionic emulsifiers and mixtures thereof.

The following are mentioned as examples of eminently suitable anionic emulsifiers:
higher fatty acids, resinic acids, acid fatty alcohol sulphuric acid esters, higher alkyl sulphonates and alkylaryl sulphonates, sulphosuccinic acid esters or the salts of sulphated ethylene oxide adducts. Examples of cationic emulsifiers include salts of quaternary ammonium and pyridinium compounds.

Suitable non-ionic emulsifiers include the reaction products of ethylene oxide with long-chain fatty alcohols or phenols, adducts with at least 10 mols of ethylene oxide per mol of fatty alcohol or phenol preferably being used. The emulsifier is used in a quantity of from 0.5 to 20 percent by weight, based on the monomer total.

In cases where polymerisation is carried out in solution, the following solvents in particular can be used in dependence upon the monomer ester composition: aromatic solvents such as benzene, toluene, xylene, alcohols such as ethanol, propanol, isopropanol, n-butanol, isobutanol, ketones or esters such as methylethyl ketone, ethyl acetate, acetone and methylisobutyl ketone and mixtures thereof.

Polymerisation is preferably carried out in solution or emulsion.

The following represent suitable copolymerisable monomers:

a. Esters of acrylic acid and methacrylic acid having 1 to 18 carbon atoms and preferably 1 to 8 carbon atoms in the alcohol component, for example methylacrylate, methylmethacrylate, ethylacrylate, n-butylacrylate, isobutylacrylate, 2-ethylhexylacrylate and mixtures thereof;

b. Aromatic vinyl or vinylidene compounds such as halogen styrene, styrenes substituted by alkyl groups. The alkyl group of the nucleus preferably has 1 to 4 carbon atoms, whilst that of the vinyl group preferably has 1 to 2 carbon atoms. The following compounds are mentioned by way of example: styrene, $\alpha$-methylstyrene, p-methylstyrene, p-isopropylstyrene and p-chlorostyrene, styrene being preferred;

c. Vinyl esters of carboxylic acids having 2 to 8 carbon atoms, more particularly vinylacetate, vinylpropionate and vinylbutyrate, vinylbenzoate, preferably vinylacetate;

d. $\alpha,\beta$-unsaturated carboxylic acid amides having 3 to 5 carbon atoms such as acrylamide and methacrylamide, their N-hydroxymethyl compounds and alkyl ethers having 1 to 8 carbon atoms, more particularly 1 to 4 carbon atoms, in the ether alkyl radical, such as for example N-hydroxy methyl methacrylamide, N-hydroxymethylacrylamide, N-methoxymethylacrylamide, N-methoxymethylmethacrylamide, N-butoxymethylacrylamide, etc., N-butoxymethylmethacrylamide; preferably N-methoxymethylmethacrylamide;

e. Diene hydrocarbons having 4 to 6 carbon atoms and, more particularly, conjugated dienes such as, for example, 1,3-butadiene, isoprene, piperylene, 1,3-hexadiene and the like; preferably 1,3-butadiene;

f. Optionally, $\alpha,\beta$-unsaturated nitriles such as (meth) acrylonitrile, $\alpha,\beta$-unsaturated monocarboxylic acids such as acrylic acid or methacrylic acid, $\alpha,\beta$-unsaturated halides such as vinyl chloride, vinyl fluoride and vinyl bromide; preferably acrylonitrile, vinyl chloride, acrylic acid and methacrylic acid.

Crosslinkable homopolymers and copolymers with average molecular weights of from about 800 to more than 300,000, can be synthesized from the monomers according to the invention. These polymers are either liquid, semi-solid or solid compositions. Even in the uncrosslinked state, elastic and hard films can be produced from the high molecular weight copolymers on metal surfaces and other suitable substrates. It is also possible to produce shaped articles from copolymers of this kind. By virtue of the aromatic amino groups, the low molecular weight polymers which are liquid or readily fusible are suitable for use as hardeners for cast resins hardenable with amino compounds.

The properties of the polymers, such as solubility and mechanical properties, can be modified within wide limits by reacting the polymers at room temperature or at an elevated temperature (up to about 200° C) with crosslinking agents, for example with aldehyde or aldehyde donors or aldehyde derivatives such as methylol compounds. Formaldehyde, hexahydroxy methylmelamine, hexamethoxy methylmelamine, dihydroxymethyl urea, tetrahydroxymethylhydrazodicarbonamide and tetramethylene tetramine are mentioned by way of example.

Another method of crosslinking the polymers according to the invention having aromatic amino groups is to treat them with polyisocyanates. In this case, crosslinking takes place through urea groups. Crosslinked foams are obtained when this reaction is carried out in the presence of water or low-boiling hydrocarbons.

The property spectrum of the resulting plastics is determined by the quality both of the copolymers and of the polyisocyanates.

Suitable polyisocyanates include both the usual diisocyanates such as, for example, 4,4'-diphenyl methane diisocyanate, tolylene diisocyanate, 1,5-naphthylene diisocyanate, and also the addition products of dihydroxy and polyhydroxy compounds with diisocyanates, so-called prepolymers.

Hard to brittle highly crosslinked plastics are obtained by reacting copolymers with a high content of aromatic amino groups with the conventional diisocyanates. If addition products of relatively high molecular weight polyhydroxy compounds with diisocyanates, for example addition products of 1 mol of polypropylene ether or polyester (molecular weight 1,000 to 2,000) and 2 mols of tolylene diisocyanate, are used instead of the low molecular weight diisocyanates, soft elastic products are obtained which contain both the polymer segment and also the polypropylene ether or polyester segment as chain segments.

In one particular embodiment of the process, the polymerisation reaction and the polyaddition reaction with diisocyanates are carried out either at the same time or at time intervals graduated as required.

The polymers according to the invention offer a whole number of possibilities of combination for the production of solid, foamed and microporous plastics, of films, coatings and coverings, the properties of these shaped articles being determined by the quality of the synthesis components in their quantitative ratio.

The parts and percentages quoted in the following Examples refer to weight unless otherwise stated.

EXAMPLE 1

Methacryloyl hydroxypropyl anthranilic acid ester 5 g of sodium hydroxide and 150 mg of 4-methoxymethyl-2,6-di-tert.-butylphenol were added to 144 g (1 mol) of methacrylic acid-$\beta$-hydroxy propyl ester (corresponds to a commercial mixture of 83 percent of methacrylic acid-$\beta$-methyl-$\beta$-hydroxy ethyl ester and 17 percent of methacrylic acid-$\alpha$-methyl-$\beta$-hydroxy ethyl ester) and 180 g (1.1 mol) of isatoic acid anhydride and the resulting mixture was reacted in 500 ml of dry dioxan. The reaction which begins at 60° C is terminated by brief heating to 90° C. A gas meter which measures the quantity of $CO_2$ evolved is used for control purposes. After 24 litres have escaped, the product is filtered off under suction while still hot and the dioxan removed in a rotary evaporator. The yield of end product, in the form of a brownish viscous oil, comprises 249.5 g $\triangleq$ 95 percent of the theoretical.

If any absolutely alkali-free product is required, the product left following removal of the dioxan is taken up in 1 litre of methylene chloride, with 1 litre of water added and then carbon dioxide is introduced with intensive mixing. The organic phase is separated off and the solvent is removed in a rotary evaporator.

A sample of the substance polymerises spontaneously on a water bath following the addition of azoisobutyrodinitrile.

| Molecular weight calculated: 263 | | found: 261 |
|---|---|---|
| Calculated: | C 63.9% H 6.5% | N 5.3% |
| Found: | C 64.2% H 6.4% | N 5.1% |

In a test carried out on a larger scale, starting with 10 kg of commercial methacrylic acid-$\beta$-hydroxy propyl ester, titration of the primary amino group with $n/10$ perchloric acid in glacial acetic acid with crystal violet as indicator gave a conversion degree of 92 percent.

EXAMPLE 2

Methacryloyl hydroxy ethyl anthranilic acid ester 260 g (2 mols) of freshly distilled methacrylic acid-$\beta$-hydroxy ethyl ester are reacted as described in Example 1 with 340 g (2.08 mol) of isatoic acid anhydride, 10 g of sodium hydroxide and 0.4 g of 4-methoxymethyl-2,6-di-tert.-butylphenol in 1 litre of dioxan and the reaction product worked up as described in Example 1. Yield: 367 g $\triangleq$ 74 percent of the theoretical of a honey-yellow viscous liquid which gradually crystallises through.

| Calculated: | C 62.6% | H 6.02% | N 5.62% |
|---|---|---|---|
| Found: | C 62.3% | H 6.2% | N 5.4% |
| Molecular weight calculated: 249 | | found: 256 | |

According to titration with n/10 perchloric acid in glacial acetic acid, the amine content corresponds to 100 percent of the theoretical.

EXAMPLE 3

Acryloyl hydroxy ethyl anthranilic acid ester

The procedure is as described in Example 2, except that 232 g (2 mols) of acrylic acid-β-hydroxy ethyl ester are used. 390 g 83 percent of the theoretical of a yellowish viscous substance are obtained.

| Calculated: | C 61.2% | H 5.5% | N 6.0% |
|---|---|---|---|
| Found: | C 61.2% | H 5.3% | N 5.7% |
| Molecular weight calculated: 235 | | found: 244 | |

According to titration with n/10 perchloric acid in glacial acetic acid, the amine content corresponds to 97 percent of the theoretical.

EXAMPLE 4

Acryloyl hydroxy butyl anthranilic acid ester 288 g (2 mols) of butane diol monoacrylate are reacted with 340 g (2.08 mol) of isatoic acid anhydride, 10 g of sodium hydroxide and 0.4 g of 3-methoxymethyl-2,6-di-tert.-butylphenol in 1 litre of dioxan, and the reaction product worked up as described in Example 1. Yield: 460 g ≙ 87.5 percent of the theoretical of a brownish viscous substance.

According to titration with n/10 perchloric acid in glacial acetic acid, the amine content corresponds to 95 percent of the theoretical.

| Calculated: | C 63.8% | H 6.5% | N 5.5% |
|---|---|---|---|
| Found: | C 63.4% | H 6.2% | N 5.8% |
| Molecular weight calculated: 263 | | found: 276 | |

EXAMPLE 5

Methacryloyl hydroxy butyl anthranilic acid ester

The procedure is as in Example 4 except that 316 g (2 mols) of butane diol methacrylate are used instead of the butane diol monoacrylate. 421 g ≙ 76 percent of the theoretical of a brownish viscous liquid are obtained.

According to titration with n/10 perchloric acid in glacial acetic acid, the amine content corresponds to 98 percent of the theoretical.

| Calculated: | C 65.0% | H 6.85% | N 5.1% |
|---|---|---|---|
| Found: | C 64.7% | H 6.6% | N 5.4% |
| Molecular weight calculated: 277 | | found: 284 | |

EXAMPLE 6

A mixture of 85 parts of styrene and 15 parts of acryloyl hydroxy butyl anthranilic acid ester in 275 parts of xylene is introduced into and heated to 110° – 120° C in a flask equipped with a stirring mechanism, a reflux condenser and a dropping funnel.

A solution of 2.5 parts of tert.-butyl peroctoate in 25 parts of xylene is added dropwise over a period of 4 hours. On completion of the addition, stirring is continued for 4 hours at 110° C, after which the mixture is left to cool to room temperature. The solution has a solids content of 25.0 percent by weight and a viscosity of 17 cP, as measured in a Brookfield viscosimeter, spindle 2, at 60 r.p.m. The polymer has a gel content of 0 percent.

When 100 parts of the aforementioned polymer are mixed with 10 parts by weight of hexamethoxymethyl melamine and 0.5 part by weight of citric acid, and the resulting mixture stoved for 30 minutes at 150° C to form films on metal plates, a crosslinked product with a gel content of 85.5 percent is obtained. The resulting coating is extremely hard, glossy and satisfactory in its elasticity.

100 parts of the polymer are mixed with 10 parts by weight of a liquid polyisocyanate obtained by reacting 3.0 mols of 1,6-diisocyanatohexane with 1 mol of water in accordance with German Patent Specification No. 1,101,394, and 0.5 parts of zinc octoate and the resulting mixture heated for 30 minutes at 150° C, to produce a crosslinked product with a gel content of 86.1 percent. Films produced from this two-component system on bonderised plates show good adhesion (lattice cut [according to DIN 53 151] of 1) coupled with good elasticity values (Erichsen values [according to DIN 53 156] of 8.6 mm).

EXAMPLE 7

A copolymer was prepared by the procedure described in Example 6 from 15 parts of methacryloyl hydroxy ethyl anthranilic acid ester, 50 parts of styrene, 35 parts of acrylic acid butyl ester and 1.0 part of tert.-dodecyl mercaptan in 400 parts of butyl acetate.

The 19.9 percent solution had a viscosity of 22.5 cP, as measured in a Brookfield viscosimeter, spindle 2, at 60 r.p.m. The polymer had a gel content of 0 percent.

100 parts of the aforementioned polymer were mixed with 10 parts by weight of hexamethoxymethyl melamine and 0.5 parts by weight of citric acid and the resulting mixture stoved for 30 minutes at 150° C, to produce a crosslinked product with a gel content of 82.9 percent. The adhesion of a film such as this is excellent (lattice cut 1) as is its elasticity (Erichsen value 6.9 mm). Bending of the plate through 180° did not damage the film in any way.

100 parts of the polymer were mixed with 10 parts by weight of the polyisocyanate described in Example 6 and 0.5 parts of zinc octoate, and the resulting mixture heated for 30 minutes at 150° C, to produce a crosslinked product with a gel content of 80.8 percent. After bending through 180°, films of this mixture do not show any cracks. Erichsen value 9.1 mm and lattice cut 1.

Determining the gel content

A film was cast on a glass plate from the mixtures of the polymers with the crosslinking agents. This film was hardened for 30 minutes at 150° C. Approximately 0.25 g of the film were then weighed by differential weighing into a 100 ml iodine-number Erlenmeyer flask. 50 ml of toluene were then added and the Erlenmeyer flask left standing for a period of some 17 to 20 hours during which it was occasionally vigorously shaken. After this "dissolution time," the contents of the Erlenmeyer flask were quantitatively transferred into a centrifuge beaker. The undissolved polymer was deposited at a rotational speed of 25,000. The supernatant solvent was decantered off or pipetted off. The residue in the centrifuge beakers was reweighed in vacuo after drying for 20 hours at 70° C. The percentage microgel content can be derived from the following formula:

Residue × 100/Quantity weighed in = Gel content in percent

EXAMPLE 8

A solution of 1.0 part by weight of lauryl sulphate in 100.0 parts by weight of softened water is introduced into a flask equipped with a stirring mechanism, a reflux condenser and two dropping funnels, followed by the addition of 10 percent of the monomer mixture described below. The pH value of the mixture is adjusted to 5.0 with 1 N sulphuric acid. The contents of the flask are then heated to 75° C, and a solution of 1.0 parts by weight of potassium persulphate in 10.0 parts by weight of softened water is added. The polymerisation reaction, which is an exothermic reaction, begins immediately. The following two components are uniformly introduced dropwise into the reaction vessel over a period of 4 hours beginning 10 minutes after the activator solution has been added at an internal temperature of 75° C:

1. The remaining 90 percent of the monomers consisting of 60.0 parts by weight of butyl acrylate, 35.0 parts by weight of styrene and 5.0 parts by weight of methacryloyl hydroxy butyl anthranilic acid ester,
2. 4.0 parts by weight of lauryl sulphate dissolved in 40.0 parts by weight of softened water.

The mixture is then stirred for 3 hours at 75° C, after which it is cooled to room temperature. A thinly liquid latex with a solids content of 40.5 percent is obtained.

A comparison latex was prepared in the same way, except that 60.0 parts by weight of butyl acrylate and 40.0 parts by weight of styrene were used as monomer in the absence of the polymerisable amine according to the invention. A latex with a solids content of 40.2 percent was obtained in this case.

In order to investigate crosslinkability, the latex prepared in accordance with the invention and the comparison latex were concentrated in vacuo to dryness in Petri dishes at about 40° C and then heated for 3 hours at 90° C. In the case of sample A, there was no addition to the latex. In the case of sample B, 2.0 parts by weight, based on 100 parts by weight of polymer, of a partially etherified hexahydroxymethyl melamine, dissolved in water, were added. Sample C was obtained by adding 1.8 parts by weight of hexamethylene diisocyanate, based on 100 parts by weight of polymer, to part of the films obtained as Sample A, following dissolution in toluene, distilling off most of the toluene in vacuo and drying the residual film in a drying cabinet at 70° C.

The gel contents of samples A and B were determined in toluene as described above, whilst in the case of samples C their solubility in toluene was determined.

|  | Gel content Sample A | Gel content Sample B | Solubility Sample C |
| --- | --- | --- | --- |
| Latex Example 8 | 5.2% | 95 % | insoluble gel |
| Comparison latex | 4.3% | 4.5% | soluble |

EXAMPLE 9

A latex was prepared by the procedure described in Example 6, 95.0 parts by weight of styrene and 5.0 parts by weight of acryloyl hydroxy butyl anthranilic acid ester being used as monomer and the pH value of the mixture being adjusted to pH 8.0. A thinly liquid latex with a solids content of 40.0 percent was obtained. The comparison latex of 100 parts by weight of styrene without the amine according to the invention as monomer was obtained in the form of a thinly liquid latex with a solids concentration of 40.6 percent.

The crosslinking reactions carried out as described in Example 8 produced the following gel contents:

|  | Gel content Sample A | Gel content Sample B | Solubility Sample C |
| --- | --- | --- | --- |
| Latex Example 9 | 13 % | 99 % | completely insoluble gel |
| Comparison latex | 2.8% | 3.0% | soluble |

EXAMPLE 10

A latex was prepared by the procedure described in Example 8 with 85.0 parts by weight of ethylacrylate, 10 parts of vinyl chloride and 5.0 parts by weight of acryloyl hydroxy butyl anthranilic acid ester being used as monomer and the pH value of the mixture being adjusted to pH 8.0. A thinly liquid latex with a solids content of 40.3 percent was obtained.

A comparison latex prepared in the same way with 100.0 parts by weight of ethylacrylate but without the amine according to the invention as monomer had a solids concentration of 40.0 percent.

The crosslinking reactions carried out as in Example 8 produced the following gel contents:

|  | Gel content Sample A | Gel content Sample B | Solubility Sample C |
| --- | --- | --- | --- |
| Latex Example 10 | 31 % | 96 % | insoluble gel |
| Comparison latex | 1.7% | 2.8% | soluble |

EXAMPLE 11

A solution of 0.2 parts by weight of lauryl sulphate and 0.8 parts by weight of benzyl-p-oxidiphenyl polyglycol ether with an average degree of ethoxylation of 15 in 100 parts by weight of softened water, was introduced into a flask equipped with a stirring mechanism, a reflux condenser and two dropping funnels, and 10 percent of the monomer mixture described below added. The mixture was adjusted to pH 5 with 1 N sulphuric acid. The contents were then heated to 75° C and activated with a solution of 1.0 part by weight of potassium persulphate in 10.0 parts by weight of softened water. The reaction, which was exothermic, began immediately, and after 10 minutes the following two solutions were uniformly added over a period of 3 hours at an internal temperature of 75° C.

1. The remaining 90 percent of the monomer mixture of 95.0 parts by weight of ethyl acrylate and 5.0 parts by weight of methacryloyl hydroxy ethyl- anthranilic acid ester,
2. A solution of 0.8 parts by weight of lauryl sulphate and 3.2 parts by weight of benzyl-p-oxidiphenyl polyglycol ether in 40 parts by weight of softened water.

On completion of the additions, the mixture was stirred for another 3 hours at an internal temperature of 75° C, and then cooled to room temperature. A thinly liquid latex with a solids content of 39.8 percent was formed.

A comparison latex was obtained as described above by using 100.0 parts by weight of ethyl acrylate as monomer. It had a solids concentration of 40.7 percent.

In the crosslinking tests carried out as described in Example 8, the following gel contents were determined in the films:

|  | Gel content Sample A | Gel content Sample B | Solubility Sample C |
|---|---|---|---|
| Latex Example 11 | 11 % | 94 % | insoluble gel |
| Comparison latex | 1.4% | 3.8% | soluble |

EXAMPLE 12

25 parts by weight of softened water in which 0.2 parts by weight of lauryl sulphate, 1.0 parts by weight of disodium hydrogen phosphate and 0.05 part by weight of ethylene diamine tetra acetic acid (sodium salt) were dissolved, and 15 percent of the monomer mixture described below, were introduced into a pressure autoclave. The contents of the autoclave were heated to 80° C and activated with a solution of 1.0 parts by weight of potassium persulphate in 20.0 parts by weight of softened water. 20 minutes after the activator solution had been added, separate introduction of the following two solutions was commenced:

1. The remaining 85 percent of the monomer mixture of 60.0 parts by weight of butadiene, 34.0 parts by weight of styrene and 6.0 parts by weight of methacryloyl hydroxy ethyl anthranilic acid ester to which 0.3 parts by weight of tert.-dodecyl mercaptan had been added as regulator,
2. A solution of 1.8 parts by weight of lauryl sulphate, 0.5 parts by weight of sodium bicarbonate and 0.1 parts by weight of sodium pyrosulphite in 55.0 parts by weight of softened water.

The two solutions were uniformly introduced under pressure over a period of 8 hours at an internal temperature of 75° C. On completion of the addition, the mixture was stirred for another 3 hours at 80° C. The contents of the autoclave were then cooled to room temperature, followed by the addition of a solution of 0.3 parts by weight of sodium dithionate in 3.0 parts by weight of softened water. 3.0 parts by weight of a 50 percent emulsion of a phenolic antiager were added for stabilisation. A 49.8 percent latex was obtained. A comparison latex prepared as described above with a monomer composition of 60.0 parts by weight of butadiene and 40.0 parts by weight of styrene without any polymerisable amine according to the invention had a solids concentration of 48.7 percent.

The following gel contents were found in the crosslinked films produced in accordance with Example 8:

|  | Gel content Sample A | Gel content Sample B | Solubility Sample C |
|---|---|---|---|
| Latex Example 12 | 3.2% | 98 % | insoluble gel |
| Comparison latex | 1.2% | 1.6% | soluble |

EXAMPLE 13

A mixture of 100 parts of methyacryloyl hydroxy ethyl anthranilic acid ester, 1 part of tert.-dodecyl mercaptan and 2 parts of tert.-butyl peroctoate was polymerised in 400 parts of butyl acetate as described in Example 6. A 20.1 percent resin solution with a runout viscosity in a DIN-6 cup of 8.5 seconds was obtained. Films produced from a mixture of this polymer with 10 parts by weight (based on 100 parts of polymer) of hexamethoxymethyl melamine and 0.5 parts of citric acid (stoving temperature 130° C), showed good adhesion (lattice cut of 1) and excellent elasticity (Erichsen value of 5.4 mm).

EXAMPLE 14

A mixture of 28 parts of acryloyl hydroxy butyl anthranilic acid ester, 37 parts of styrene, 5 parts of vinyl acetate, 30 parts of 2-ethylhexylacrylate, 1 part of tert.-dodecyl mercaptan and 2 parts of tert.-butyl peroctoate, was polymerised in 400 parts of butyl acetate as described in Example 6. The 19.7 percent resin solution had a runout viscosity of 7.2 seconds in a DIN-6 cup. Films produced from this polymer after it had been admixed with 15 parts by weight of the polyisocyanate described in Example 6 and 0.5 parts of zinc octoate, showed a lattice cut of 1 and an Erichsen value of 7.9 mm.

EXAMPLE 15

A mixture of 5 parts of acryloyl hydroxy butyl anthranilic acid ester, 50 parts of styrene, 32 parts of butyl acrylate, 12 parts of methoxymethylacrylamide, 1 part of acrylic acid, 1 part of tert.-dodecyl mercaptan and 2 parts of tert.-butyl peroctoate, was polymerised in 400 parts of butyl acetate as described in Example 6 to form a 19.8 percent resin solution. The resin solution had a runout viscosity in a DIN-6 cup of 7.5 seconds. 2 parts of citric acid (based on 100 parts of polymer) were added and the solution was stoved at 160° C. The films showed excellent adhesion and elasticity (lattice cut of 1 and Erichsen value of 8.5 mm).

EXAMPLE 16

A mixture of 61 parts of methacrylic acid methyl ester, 10 parts of acryloyl hydroxy methyl anthranilic acid ester, 3 parts of acrylamide, 21 parts of acrylic acid butyl ester, 5 parts of acrylonitrile, 3 parts of tert.-dodecyl mercaptan and 3 parts of tert.-butyl peroctoate was polymerised in 75 parts of methylethyl ketone and 75 parts of toluene as described in Example 6. A 39.9 percent solution with a runout viscosity of 34.2 seconds in a DIN-6 cup was obtained. 10 parts of the polyisocyanate described in Example 6 and 0.5 parts of zinc octoate to 100 parts of the polymer were added and the films were cast and hardened at room temperature. The films have a lattice cut of 1 and an Erichsen value of 4.5 mm.

We claim:
1. Anthranilic acid esters of the formula

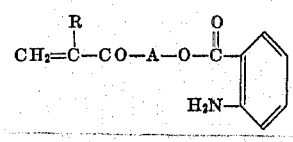

wherein R is hydrogen or methyl and A is $-OC_nH_{2n}-$ wherein n is 2 to 10,

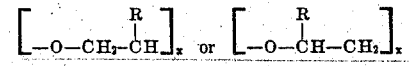

wherein $x$ is 1 to 10.